United States Patent
Ahamed et al.

(10) Patent No.: US 12,351,406 B2
(45) Date of Patent: Jul. 8, 2025

(54) APPARATUSES AND METHODS FOR HANDLING OPTICAL DEVICES OF VARYING GEOMETRIES

(71) Applicant: Applied Materials, Inc., Santa Clara, CA (US)

(72) Inventors: Yaseer Arafath Ahamed, Austin, TX (US); Neal Ricks, San Jose, CA (US); James D. Strassner, Austin, TX (US); Kangkang Wang, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/151,668

(22) Filed: Jan. 9, 2023

(65) Prior Publication Data

US 2023/0227276 A1    Jul. 20, 2023

(51) Int. Cl.
  *B25J 15/06* (2006.01)
  *B25J 15/00* (2006.01)
  *B65G 49/06* (2006.01)

(52) U.S. Cl.
  CPC ........ *B65G 49/065* (2013.01); *B25J 15/0028* (2013.01); *B25J 15/0616* (2013.01); *B65G 2203/0216* (2013.01); *B65G 2203/041* (2013.01)

(58) Field of Classification Search
  CPC .......... B65G 49/065; B65G 2203/0216; B65G 2203/041; B65G 2249/04; B65G 49/067;
  (Continued)

(56) References Cited

U.S. PATENT DOCUMENTS

| 4,735,449 A | 4/1988 | Kuma | |
|---|---|---|---|
| 8,290,624 B2 * | 10/2012 | Hjornet | B65G 47/917 414/737 |

(Continued)

FOREIGN PATENT DOCUMENTS

| CN | 102101296 A | 6/2011 |
|---|---|---|
| EP | 2468451 A2 | 6/2012 |

(Continued)

OTHER PUBLICATIONS

PCT Notification of Transmittal of the International Search Report and the Written Opinion of the International Searching Authority for International Application No. PCT/US2023/010334; dated Jan. 6, 2023.

(Continued)

*Primary Examiner* — Lynn E Schwenning
(74) *Attorney, Agent, or Firm* — Patterson + Sheridan, LLP (57) ABSTRACT

Embodiments of the present disclosure generally relate to optical devices. More specifically, embodiments described herein relate to apparatuses and methods for gripping optical devices. In an embodiment, an apparatus for gripping an optical device includes a base coupled to a proximal end of a stem extending from a bottom surface of the base. The apparatus also includes a plurality of arms movably coupled to the bottom surface of the base. The plurality of arms are coupled to an actuator operable to move the plurality of arms laterally along a X-Y plane parallel to the bottom surface of the base. In some embodiments, the apparatus includes a suction pad operable to provide a non-contact vertical suction force.

20 Claims, 5 Drawing Sheets (58) Field of Classification Search
CPC . B65G 49/061; B25J 15/0028; B25J 15/0616; B25J 15/0253; B25J 19/023
See application file for complete search history.

(56) References Cited

U.S. PATENT DOCUMENTS

2017/0062263 A1* 3/2017 Kesil ................ H01L 21/68707
2017/0256436 A1* 9/2017 Rashkovsky ..... H01L 21/68785

FOREIGN PATENT DOCUMENTS

| | | |
|---|---|---|
| JP | S6352987 A | 3/1988 |
| JP | H01109091 A | 4/1989 |
| JP | 2007-069316 A | 3/2007 |
| JP | 2007-109748 A | 4/2007 |
| JP | 2010-524712 A | 7/2010 |
| JP | 2020-093367 A | 6/2020 |
| KR | 2012-0061598 A | 6/2012 |
| KR | 10-2014-0003764 A | 1/2014 |
| KR | 101906474 B1 | 10/2018 |

OTHER PUBLICATIONS

Japanese Office Action dated Apr. 22, 2025 for Application No. 2024-542904.

* cited by examiner

APPARATUSES AND METHODS FOR HANDLING OPTICAL DEVICES OF VARYING GEOMETRIES

RELATED APPLICATIONS

This application claims benefit of and priority to U.S. Provisional Application No. 63/300,543, filed Jan. 18, 2022, which is herein incorporated in its entirety by reference for all purposes.

BACKGROUND

Field

Embodiments of the present disclosure generally relate to optical devices. More specifically, embodiments described herein relate to apparatuses and methods for retaining optical devices.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Optical devices including waveguide combiners, such as augmented reality waveguide combiners, and flat optical devices, such as metasurfaces, are used to assist in overlaying images. Generated light is propagated through an optical device until the light exits the optical device and is overlaid on the ambient environment.

Optical devices generally include structures and components disposed on the optical devices. The optical devices and structures are formed from thin, brittle materials that may be damaged when exposed to external stresses or external contaminants. Additionally, some coatings applied over the structures are sensitive and may be damaged during manufacturing if not properly handles. Thus, optical devices are susceptible to damage when transferring the optical devices between different processing tools is difficult. Due to the thin and delicate nature of optical devices, as well as the varying geometries thereof, retaining, e.g., gripping, the optical device can be difficult. One such difficulty is gripping the optical devices without damaging, deforming, distorting, or leaving marks and/or reside on the optical devices.

Accordingly, what is needed in the art are improved devices and methods for retaining optical devices.

SUMMARY

In an embodiment, an apparatus for retaining an optical device is provided. The apparatus includes a base coupled to a proximal end of a stem extending from a bottom surface of the base. A suction pad is disposed at a distal end of the stem. The suction pad is operable to provide a non-contact vertical suction force against a substrate to be retained by the apparatus. The apparatus also includes a plurality of arms movably coupled to the bottom surface of the base. The plurality of arms are coupled to an actuator operable to move the plurality of arms laterally along a X-Y plane parallel to the bottom surface of the base. The plurality of arms also include a plurality of retention pads disposed on each of the plurality of arms.

In another embodiment, an apparatus for retaining an optical device is provided. The apparatus includes a gripper actuator coupled to a proximal end of a stem, wherein the stem extends from a bottom surface of the actuator. A suction pad disposed at a distal end of the stem, and the suction pad operable to provide a non-contact vertical suction force against a substrate to be retained. The apparatus also includes a first and second arm coupled to the gripper actuator. The actuator is operable to move the plurality of arms laterally along a X-Y plane parallel to the bottom surface of the actuator. The plurality of arms also include a plurality of retention pads disposed on each of the plurality of arms.

In yet another embodiment, a method for retaining an optical device is provided. The method includes positioning a substrate to be retained below a plurality of retention pads disposed on a first arm and a second arm of a retaining device. The first and second arms of the retaining device are operatively coupled to an actuator and disposed on opposite sides of a suction pad operable to provide a vertical holding force to the substrate to be retained. The method continues with operating the first arm to move the retention pads disposed on the first arm to just contact edge of the substrate to be retained, operating the second arm to move the retention pads disposed on the second arm to contact and apply a lateral force to the substrate to be retained, and activating the suction pad to provide the vertical holding force to the substrate to be retained.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to apparatus and methods for retaining optical devices. In one embodiment, the apparatus includes a base coupled to a stem extending from a bottom surface of the base. A suction pad disposed on the stem is operable to provide a non-contact vertical holding force to a substrate to be retained by the apparatus. A plurality of arms extend from the base and each of the plurality of arms may be coupled to an actuator operable to move each of the plurality of arms in a lateral direction parallel to and along a bottom surface of the base. A plurality of retention pads are also disposed on each of the plurality of arms for directly contacting and providing a lateral force to retain the optical device.

Figure 1A:
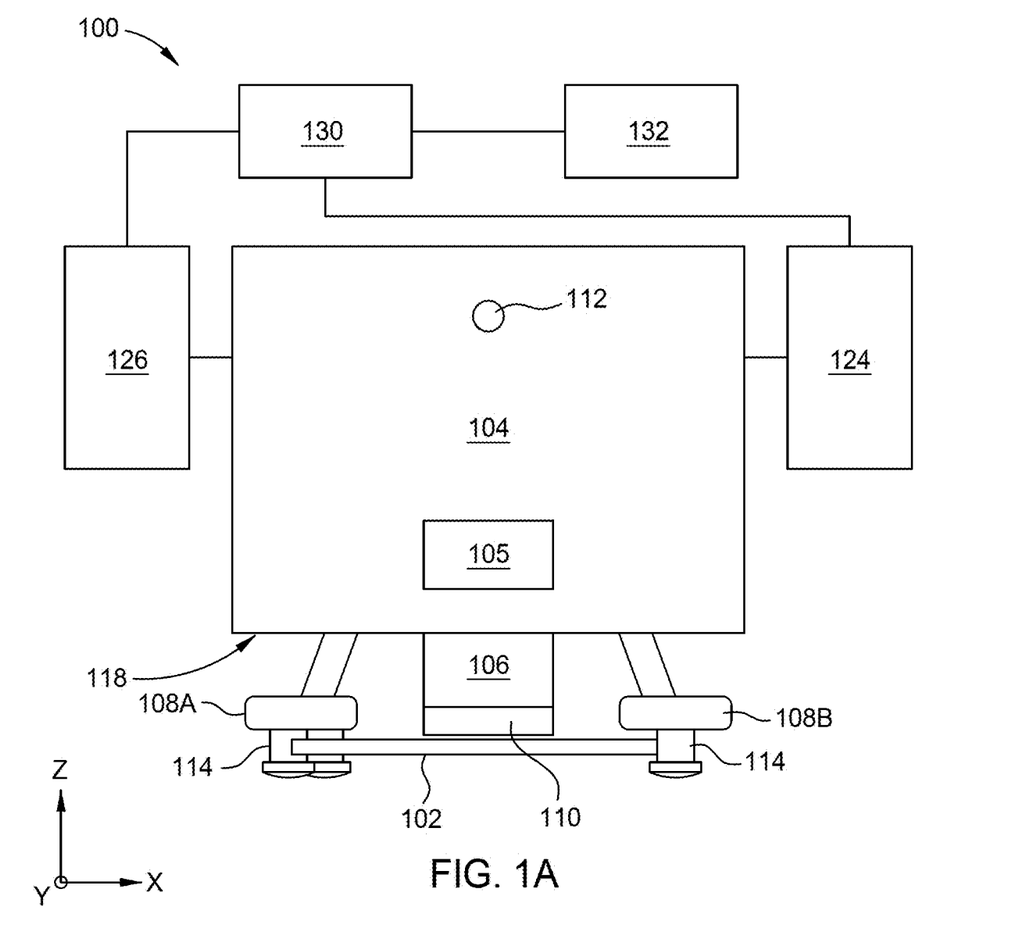
FIG. 1A is a schematic, cross-sectional view of a retaining device, according to certain embodiments described herein.

FIG. 1A is a schematic, cross-sectional view of a retaining device 100 according to embodiments described herein. In an embodiment, the retaining device 100 is operable to retain a substrate 102. The retaining device 100 is operable to transfer and handle the substrate 102 before, after, and/or during processing.

In one embodiment, which can be combined with other embodiments described herein, the substrate 102 can be any substrate used in the art, and can be either opaque or transparent depending on the use of the substrate. Additionally, selection of substrate 102 may further including substrates having varying shapes, thickness, and diameters. In one embodiment, which can be combined with other embodiments described herein, the substrate 102 includes, but is not limited to, a glass, silicon carbide, or combinations thereof. In another embodiment, which can be combined with other embodiments described herein, the substrate 102 is an optical device such as a waveguide combiner, a flat optical device, such as a metasurface, optical lenses, optical lens assemblies, optical frames, semiconductor wafers, and the like. In yet another embodiment, which can be combined with other embodiments described herein, the substrate 102 can have optical device structures patterned on one or more surfaces of the substrate 102.

In one embodiment, the retaining device 100 is a two axes linear retaining device. The retaining device 100 includes a base 104, a stem 106, a plurality of arms 108, a suction pad 110, an air inlet 112, and retention pads 114. In certain embodiments, which can be combined with other embodiments herein, the base 104 can be coupled to or extend from a base device (not shown) operable to transfer and handle the substrate 102, such as a robotic arm assembly of a transfer robot extending a modular cart, an interior portion of a processing chamber, an exterior portion of a processing chamber, and the like. The base 104 may be movably connected to the base device such that the base 104 and the retaining device 100 in general may be moved relative to a processing chamber to provide for gross movement and positioning of the retaining device 100 and any substrate 102 being retained thereto.

A proximal end of the stem 106 is coupled a bottom surface 118 of the base 104 with the suction pad 110 disposed at a distal end of the stem 106 opposite from the base 104. The suction pad 110 is configured to provide a non-contact suction force to "hold" the substrate 102 without physically contacting the substrate 102. In one embodiment, the force of the suction pad 110 can be used instead of the retention pads 114 in order to support the substrate 102 without contact. Alternatively, suction pad 110 can be used in addition to the retention pads 114 to enable a stronger holding force by the retaining device 100 on the substrate 102.

In one embodiment, the suction pad 110 provides a non-contact vertical suction force to the substrate 102 such that the suction pad 110 is separated from a top surface of the substrate 102 retained by the retention pads 114 by a gap of approximately about 0.3 millimeters to about 0.8 millimeters, such as about 0.5 mm. In one embodiment, which can be combined with other embodiments herein, the suction pad 110 may be a Bernoulli pad or a Coanda pad. For example, the suction pad 110 may use Bernoulli's principle or the Coanda effect to create a suction force on the substrate 102. In an embodiment, the stem 106 may further include an air inlet 112 operatively connected to the suction pad 110 and in fluid communication with an external air source or an external vacuum source (not shown). The air inlet 112 may use the external air source or the external vacuum source to provide and/or remove air from the suction pad 110 to enable the production of a vertical holding suction force by the suction pad 110. In certain embodiments, the suction pad 110 may be any device operable to provide a vertical holding force to the substrate 102 without contacting the substrate 102.

Figure 1B:
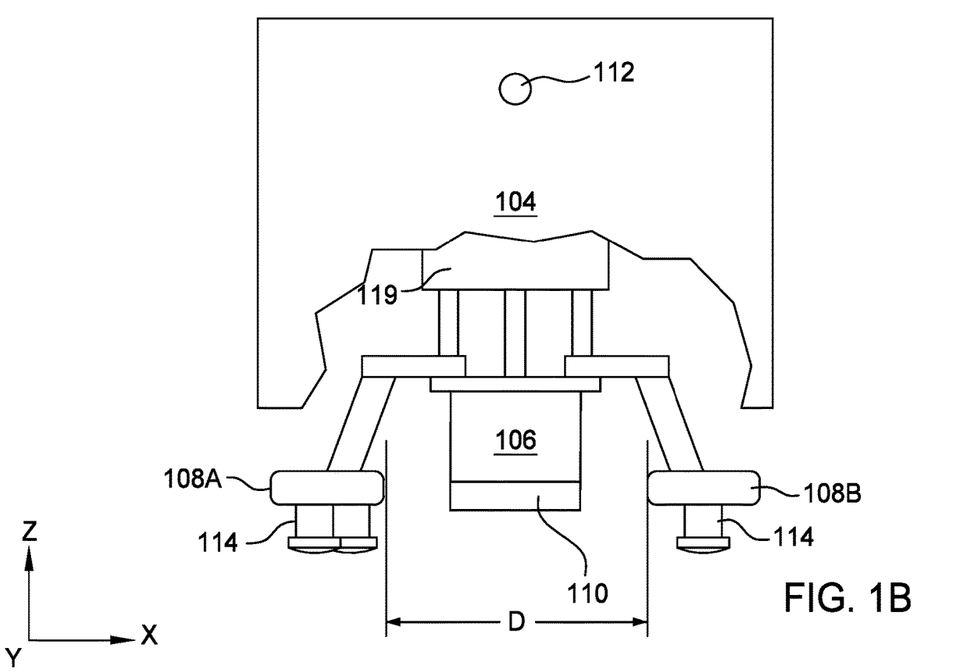
FIGS. 1B and 1C are schematic, cross-sectional views of a portion of the retaining device depicted in FIG. 1A, according to certain embodiments described herein.
Figure 2A:
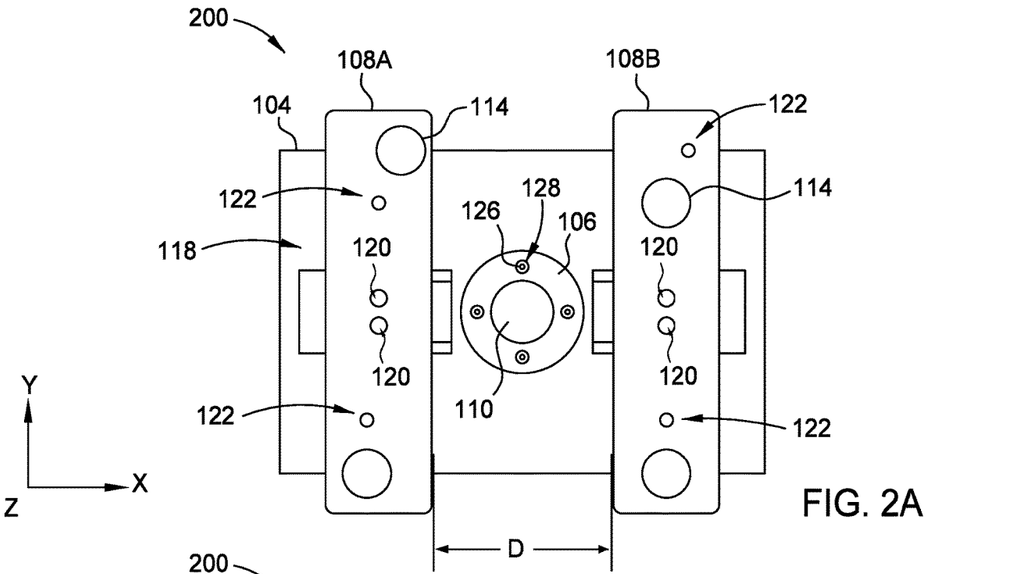
FIG. 2A is a schematic, bottom-view of a gripping device, according to certain embodiments described herein.

In an embodiment, as shown in FIGS. 1A and 2A, the plurality of arms 108 may include a first arm 108A and a second 108B. The first and second arms 108A, 108B, may each be formed as rectangular members disposed adjacent to the bottom surface 118 of the base 104 and at opposite ends of the base 104. The first and second arms 108A, 108B may be disposed parallel to one another such that the stem 106 and suction pad 110 are disposed between the middle portions of the first and second arms 108A, 108B. The plurality of arms 108 each include a plurality of retention pads 114. The retention pads 114 are configured to contact the edges of the substrate 102 to retain the substrate 102. As shown in FIGS. 1B and 2A, the retention device 100 has a retention area defined by the plurality of retention pads 114. In an embodiment, the retention area is sized to correspond to the surface area of the optical device being retained by the retaining device 100. In an embodiment, while the force from the suction pad 110 is used to retain the substrate 102 in a vertical direction i.e., the Z-direction, the retention pads 114 prevent lateral movement and/or rotation of the substrate 102, i.e., movement in the X-direction and rotation along the X-Y plane.

In one embodiment, which can include other embodiments described herein, the plurality of arms 108 may be connected to an actuator 119 for controlling and moving the plurality of arms 108 relative to the base 104. In an embodiment, the arms 108A, 108B may operate to extend away from one another and/or retract towards one another in order to support and retain the substrate 102. In one embodiment, the plurality of arms 108 may be controlled individually in force, position, and or velocity. In another embodiment, the plurality of arms 108 may be controlled together. The plurality of arms 108 may each include or be coupled to an actuator 119 to laterally move the plurality of arms 108 (and the plurality of retention pads 114 disposed on each of the plurality of arms 108 thereto) along a X-Y plane parallel to the bottom surface 118 of the base 104. In an embodiment, which may be combined with other embodiments described herein, the actuator may be an electric programmable gripper device such as an SMAC gripper coupled to or incorporated with the base 104. In another embodiment, the actuator may be a micro-actuator. Additionally, the actuator may be a voice coil actuator. Voice coil actuators are non-commutated DC linear actuators consisting of a single-pole permanent magnet and a copper coil.

Figure 1C:
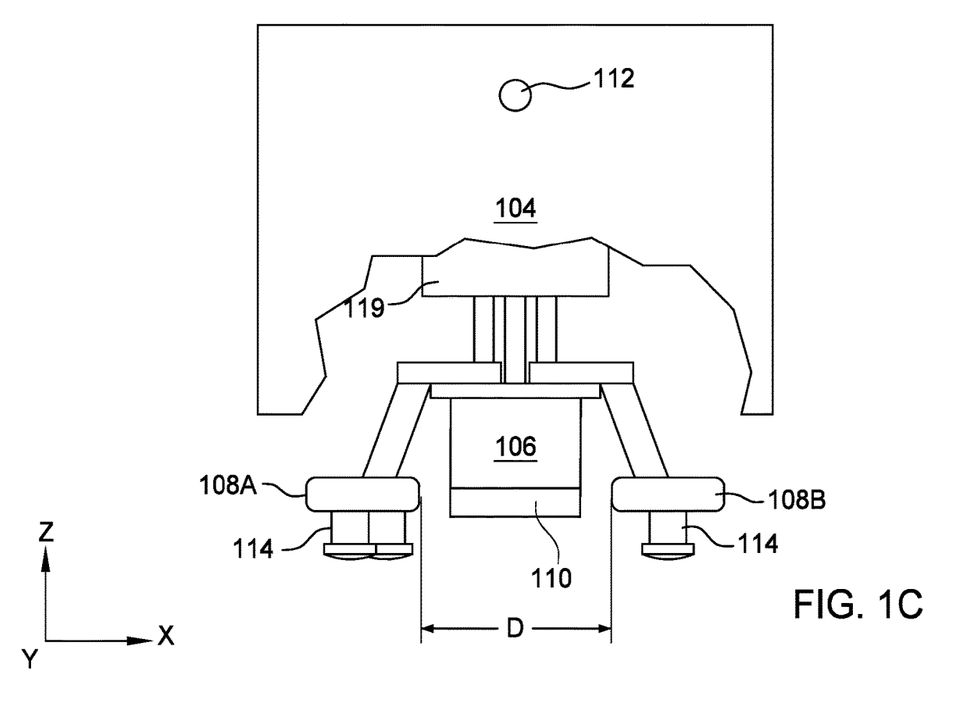

As shown in FIGS. 1B and 1C, the first and second arms 108A, 108B, may be moved relative to one another to alter the distance "D," thereby altering the retention area of the retaining device 100 defined by the space between the plurality of retention pads 114. The retention area may be increased and decreased accordingly by increasing and decreasing the distance "D," respectively, between the first and second arms 108A, 108B. For retaining the substrate 102, the positioning of the retention pads may be adjusted based on the size, shape, and location of the substrate 102. In an embodiment, which may be combined with other embodiments herein, the arms 108A, 108B may be independently controllable.

FIG. 2A is a schematic, bottom view of the retaining device 100. The retaining device 100 includes the base 104, the stem 106, the suction pad 110, the first and second arms 108A, 108B, and the retention pads 114. In one embodiment, which can be combined with other embodiments described herein, the first and second arms 108A, 108B, are each coupled to the actuator in the base 104 via a plurality of fasteners secured through the plurality of through holes 120. In another embodiment, which can be combined with other embodiments described herein, each of the plurality of retention pads 114 are coupled to the plurality of arms 108A, 108B via a plurality of openings 122. The plurality of openings 122 allow for a variety of arrangements and numbers of retention pads 114 to be disposed on each of the first and second arms 108A, 108B.

In one embodiment, which can be combined with other embodiments herein, the base 104 may be coupled to or further include a theta actuator 105 as shown in FIG. 1A such that the plurality of arms 108 may be rotated around the Z-axis thereby allowing rotational translation of the plurality of arms 108 and the retention pads 114 disposed thereto along the X-Y plane parallel to the bottom surface 118 of the base 104. Such rotational movement may allow for the retaining device 100 to better align and accommodate for substrates 102 of varying sizes and orientations. In another embodiment, the retention pads 114 may be of varying orientations and alignments when connected to each of the plurality of arms 108. For example, in one embodiment, the retention pads 114 of the first arm 108A may be in lateral alignment with the retention pads 114 of the second arm 108B. In another embodiment, the retention pads 114 of the first arm 108A may be misaligned with the retention pads 114 of the second arm 108B, as shown in FIG. 1B.

In one embodiment, which can be combined with other embodiments described herein, the retaining device 100 includes a light source 124. In one aspect, the light source 124 may be movable or fixed relative to the retaining device 100. In another aspect, the light source may be external to or integrated with the retaining device 100. The light source 124 may provide light for additional processing of the substrate 102. For example, the light source 124 may provide light for a curing process, such as by providing ultraviolet light to the substrate 102. The light source 124 may be utilized to provide lighting to the surrounding environment of the retaining device 100. In another embodiment, which can be combined with other embodiments described herein, the light source 124 is a ring light i.e., the light source 124 is a ring shape such that light is provided equally or substantially equally to the substrate 102.

In one embodiment, which can be combined with other embodiments described herein, the retaining device 100 includes a visualization system 126. The visualization system 126 may be external to or integrated with the retaining device 100. In an embodiment, as shown in FIG. 2A, the retaining device 100 includes a plurality of ports 128 disposed on the stem 106 for integration of the visualization system 126 with the retaining device 100. The plurality of ports 128 are operable to house one or more devices such as one or more cameras and/or sensors of the visualization system 126. In an embodiment, the visualization system 126 may also be communicatively coupled to a controller 130. The controller 130 may also be communicatively coupled to the retaining device 100 such that the controller 130 may facilitate operations of the visualization system 126 and the handling and transferring of the substrate 102 by the retaining device 100 in response to the data collected about the substrate 102 from the visualization system 126. In another embodiment, which can be combined with other embodiments described herein, the controller 130 is communicatively coupled to a central processing unit (CPU) 132. The controller 130 may download a program stored in a memory storage medium through an input/output (I/O) device (not shown), and carry out a method 400 described below by controlling the visualization system 126 and the retaining device 100 in accordance with the program.

The one or more cameras housed in the plurality of ports 128 may be operable to assist in the functioning of the retaining device 100 as well as metrology processes. The one or more sensors housed in the plurality of ports 128 may be proximity sensors and operable to communicate with the controller 130. For example, a sensor may communicate to the controller 130 when the substrate 102 is retained by the retaining device 100. Although FIG. 1B shows the visualization system 126 with four of the plurality of ports 128, one or more of the plurality of ports 128 may be utilized. Any number of devices such as the one or more cameras and sensors may be utilized with the retaining device 100. Additionally, the plurality of ports 128 may be disposed on other portions of the retaining device 100, such as along the bottom surface 118 of the base 104, and are therefore not limited to being disposed on the plurality of arms 108.

Each of the plurality of arms 108 may be operated in a force and/or a position mode. In the position mode, the respective arm 108 is moved to a predetermined position relative to the substrate 102 such that the retention pads on the respective arm 108 contact the edge of the substrate 102 and provides an alignment surface for "gripping" the substrate 102 between the retention pads 114 of the plurality of arms 108. In a force mode, another arm 108 is operated to contact the substrate 102 and apply a configurable force to the substrate 102 against the retention pads 114 providing the alignment surface to the substrate 102 to "grip" the substrate 102 between the retention pads 114. For example, in the embodiment shown in FIG. 1B, the first arm 108A may be operated in a position mode to contact the substrate 102 and provide an alignment surface for retaining the substrate 102, while the second arm 108B is operated in force mode to apply a configurable force to the substrate 102 and retain the substrate 102 between the plurality of retention pads 114 extending from the plurality of arms 108A, 108B. When combined with use of the suction pad 110 to apply a non-contact vertical vacuum force towards the center of the substrate 102, lateral force applied by the retaining device 100 along the edges of the substrate 102 is highly controllable and can be used to grip the substrate 102, regardless of the geometry.

The retaining force applied to the substrate 102 between the plurality of retention pads 114 by the retaining device 100 may range from about 0.1 to about 3.8 N, or from about 10 gram to about 350 gram. The actual retaining force applied to the substrate 102 by the retaining device 100 may depend on the substrate 102 and whether the suction pad 110 is in use. This retaining force provides for delicate handling of optical devices, such as lens assemblies and lens frames. In one embodiment, the suction pad 110 is not activated to create a vertical suction force to assist in "holding" the substrate 102, such as when the retaining device 100 is used to retain a lens frame that does not have a surface for the vacuum suction to be applied against. In this embodiment, the substrate 102 is supported fully by the lateral force applied by the retention pads 114.

Figure 2B:
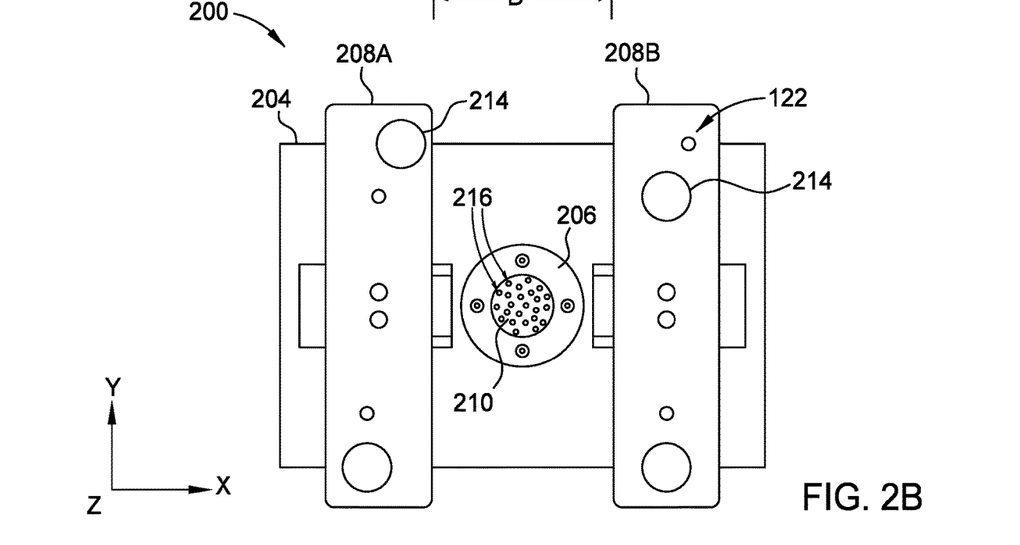
FIG. 2B is a schematic, bottom-view of a gripping device, according to certain embodiments described herein.

FIG. 2B is a schematic, bottom view of the retaining device 200, according to certain embodiments disclosed herein. The retaining device 200 includes the base plate 204, the stem 206, the suction pad 210, the plurality of arms 208 and the retention pads 214. In one embodiment, which can be combined with other embodiments herein, the base 204 can be coupled to or extend from a base device (not shown) operable to transfer and handle the substrate 102, such as a robotic arm assembly of a transfer robot extending a modular cart, an interior portion of a processing chamber, an exterior portion of a processing chamber, and the like. The base 204 may be movably connected to the base device such that the base 204 and the retaining device 200 in general may be moved relative to a processing chamber to provide for gross movement and positioning of the retaining device 200 and any substrate 102 being retained thereto.

In one embodiment, which can be combined with other embodiments herein, the suction pad 210 includes a plurality of apertures 216. The plurality of apertures 216 are in communication with the inlet 212. Therefore, air may be provided or removed via the plurality of apertures 216 to create a holding force on the substrate 102. For example, the holding force on the substrate may be created with a vacuum force applied through the plurality of apertures 216, such as by utilizing the Coandă effect.

In certain embodiments, the retention pads 114 may utilize corner contact or direct contact the edges of the substrate 102 Therefore, sensitive portions of the substrate 102, such as an optical device structure and coatings thereon, are not damaged during transfer or handling.

Figure 3:
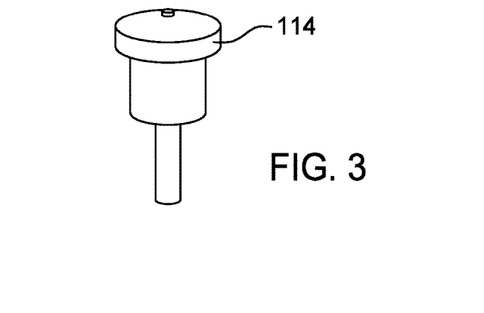
FIG. 3 is a schematic, perspective view of a retention pad, according to certain embodiments described herein.

FIG. 3 is a schematic, perspective view of an example retention pad 114, according to certain embodiments disclosed herein. The retention pads 114 are operable to be utilized in the retaining device 100 to contact the edges of the substrate 102. Although only two retention pads 114 are shown in FIGS. 2A and 2B on each of the plurality of arms 108, any number of retention pads 114 may be utilized to retain the substrate 102. In one embodiment, which can be combined with other embodiments herein, the retention pads 114 may each further include silicone sleeves.

Figure 4:
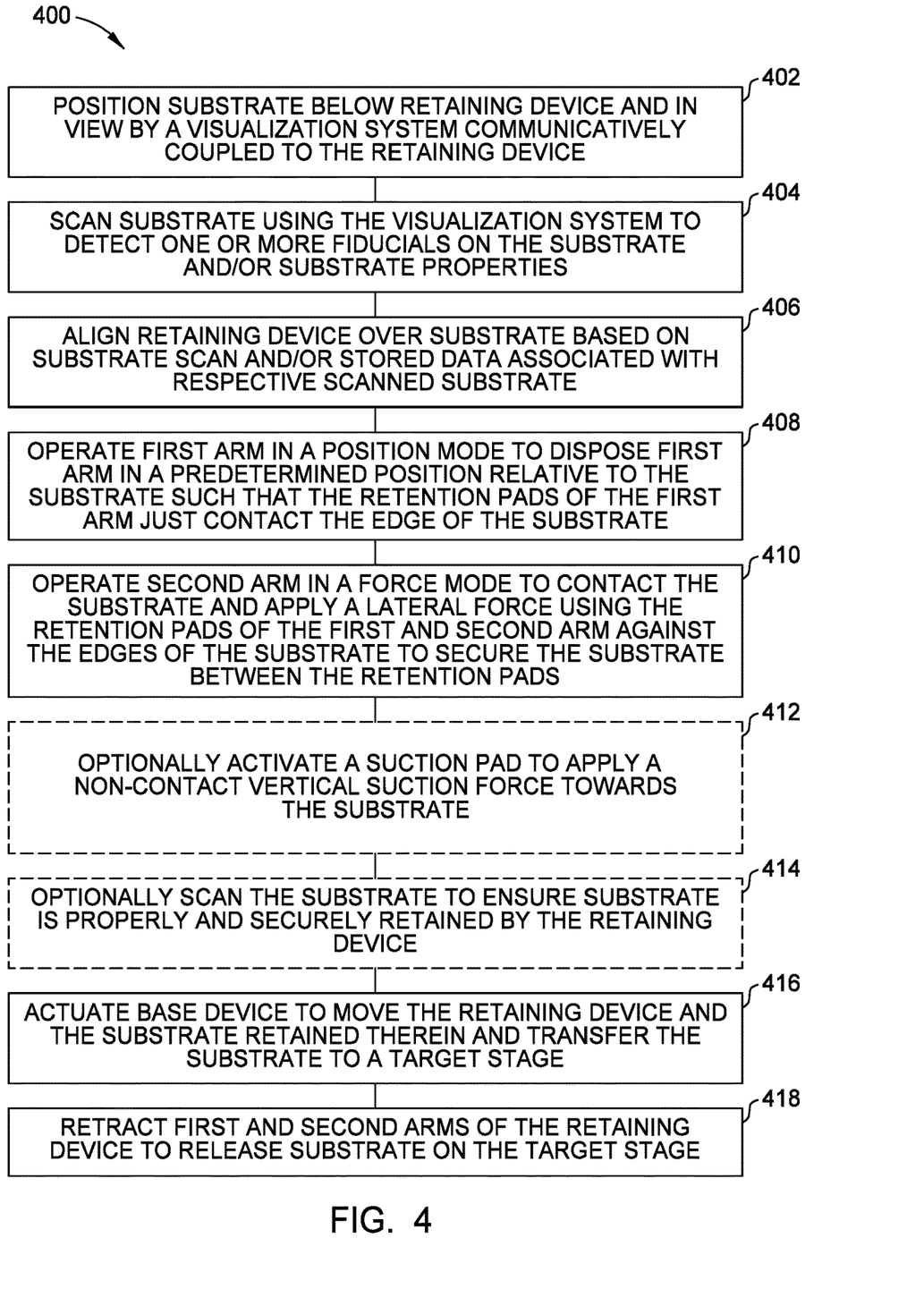
FIG. 4 is a flow diagram of a method for retaining an optical device using the embodiment of the retaining device shown in FIGS. 1A, according to certain embodiments described herein.

FIG. 4 is a flow diagram of an example method 400 for retaining the substrate 102 with the retaining device 100 described in FIG. 1, according to certain embodiments described herein. In an embodiment, the method 400 provides for picking up and moving the substrate 102 to a target stage using the retaining device 100.

Method 400 begins at operation 402 by positioning the substrate 102 below the retaining device 100 and in view by the visualization system 126 for scanning and alignment of the substrate 102 with the retaining device 100. The visualization system 126 communicatively coupled to the retaining device 100 may be external to or integrated with the retaining device 100. In an embodiment wherein the visualization system 126 is external to the retaining device 100, the visualization system 126 may include one or more movable cameras and/or sensors that can be controlled and moved accordingly to scan the substrate 102. In another embodiment, the one or more cameras and/or sensors of the visualization system 126 may be integrated with the retaining device 100 such that the positioning of the substrate 102 below the retaining device 100 in preparation for transfer also positions the substrate 102 in view by the visualization system 126 for scanning.

Next, operation 404 continues with scanning the substrate 102 using the one or more cameras and/or sensors of the visualization system 126 for detection of one or more fiducials on the substrate 102 and/or properties and related specifications of the substrate 102, such as location, orientation, size, and edges of the substrate 102. In an embodiment, the substrate 102 may be formed with one or more fiducials to assist the retaining device 100 in determining an orientation, a position, and/or any other physical property of the substrate 102 for alignment and retention by the retaining device 100. In another embodiment, which can be combined with other embodiments described herein, the operation 402 includes scanning the substrate 102 with the one or more sensors of the visualization system 126 for determination of the properties of the substrate 102 and whether the suction pad 110 is to be employed by the retaining device 100. For example, if the visualization system 126 determines the substrate 102 is a frame assembly with no surface for the suction pad 110 to apply a suction force against, then the suction pad 110 may not be activated for retaining the scanned substrate 102.

In operation 406, upon scanning of the substrate 102 by the visualization system 126, the controller 130 aligns the plurality of arms 108A, 108B of the retaining device 100 over the substrate 102 relative to the substrate 102 based on the substrate scan in preparation for contact with the plurality of retention pads 114. In an embodiment, the controller 130 may also utilize stored data associated with the scanned substrate 102, if available, when aligning the retaining device 100. In an embodiment, stored data associated with scanned substrate 102 such as specifications associated with properties of the substrate 102 may be obtained and utilized by the CPU 132 based on the one or more respective fiducials on the substrate 102 scanned by the visualization system 126.

To begin retaining or "gripping" the substrate 102, in operation 408, the retaining device 100 begins by first operating the first arm 108A in the position mode to move the first arm 108A to a predetermined position relative to the substrate 102 to provide an alignment surface to the substrate 102 for "gripping" the substrate 102. In an embodiment, the first arm 108 is therefore moved to a position such that the plurality of retention pads 114 on the first arm 108A just make contact with the substrate 102.

Once the retention pads 114 of the first arm 108A are positioned adjacent the substrate 102, in operation 410, the second arm 108B is operated in a force mode to contact and position the substrate 102 between the retention pads 114 of the first and second arms 108A, 108B, and apply a configurable force between the retention pads 114.

In operation 412, depending on the substrate 102, the retaining device 100 may optionally activate the suction pad 110 to apply a non-contact vacuum force towards the center of the substrate 102. If the suction pad 110 is activated to assist in applying a vertical holding force, then only a low lateral force may need to be applied by the retention pads 114 to prevent lateral movement and/or rotation of the substrate 102 during handling. In an embodiment, by varying the force of the retention pads 114 and the pressure of the supplied air to the suction pad 110, the holding force utilized on the substrate 102 may also be varied to avoid defects, damage, and distortion of the substrate 102.

In an embodiment, which may be combined with other embodiments herein, if the suction pad 110 is not utilized in retaining the substrate 102, the substrate 102 is supported fully by the configurable lateral force applied against the edges of the substrate 102 between the retention pads 114. Since each of the plurality of arms 108 are separately operable in either the position or force mode, the force applied against the edges of the substrate 102 is finely adjustable and can be tuned to "grip" the substrate 102 without distorting or damaging the substrate 102.

Once the substrate 102 is securely retained between the retention pads 114, in operation 414, an actuator in the base device connected to the retaining device 100 may operate to move the retaining device 100 and the substrate 102 retained therein and transfer the substrate 102 to the target stage. In an embodiment, which may be combined with other embodiments herein, operation 414 may include optionally scanning the substrate 102 prior to transferring the substrate 102 to ensure the substrate 102 is properly and securely retained by the retaining device 100. Once the substrate 102 is transferred to the target site, in operation 416, the arms 108 of the retaining device retract and the substrate 102 is released on the target stage.

Figure 5:
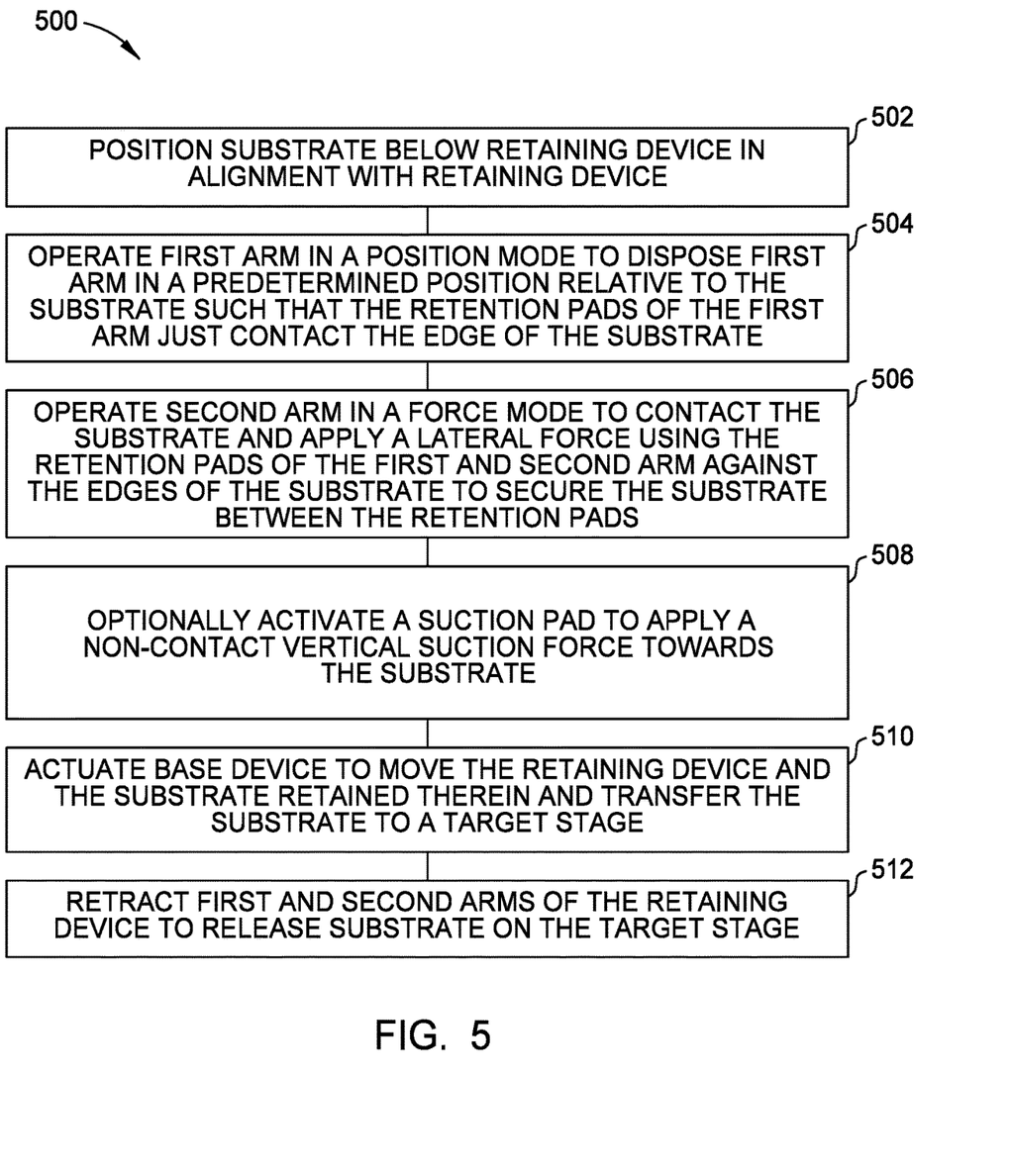
FIG. 5 is a flow diagram of a method for retaining an optical device using the embodiment of the retaining device shown in FIGS. 1A, according to certain embodiments described herein.

FIG. 5 is a flow diagram of an example method 500 for retaining the substrate 102, according to certain embodiments described herein. In an embodiment, the method 500 provides for picking up and moving the substrate 102 to a target stage using the retaining device 100.

Method 500 begins at operation 502 by positioning the substrate 102 below the retaining device 100 in position for being retained by the retaining device 100. In operation 502, the retaining device 100 begins by first operating the first arm 108A in the position mode to move the first arm 108A to a predetermined position relative to the substrate 102 to provide an alignment surface to the substrate 102 for "gripping" the substrate 102. In an embodiment, the first arm 108 is therefore moved to a position such that the plurality of retention pads 114 on the first arm 108A just make contact with the substrate 102.

Once the retention pads 114 of the first arm 108A are positioned adjacent the substrate 102, in operation 504, the second arm 108B is operated in a force mode to contact and position the substrate 102 between the retention pads 114 of the first and second arms 108A, 108B, and apply a configurable force between the retention pads 114.

Depending on the substrate 102, the retaining device 100 may optionally in operation 508 activate the suction pad 110 to apply a non-contact vacuum force towards the center of the substrate 102. If the suction pad 110 is activated to assist in applying a vertical holding force, then only a low lateral force may need to be applied by the retention pads 114 to prevent lateral movement and/or rotation of the substrate 102 during handling. In an embodiment, by varying the force of the retention pads 114 and the pressure of the supplied air to the suction pad 110, the holding force utilized on the substrate 102 may also be varied to avoid defects, damage, and distortion of the substrate 102.

In an embodiment, which may be combined with other embodiments herein, if the suction pad 110 is not utilized in retaining the substrate 102, the substrate 102 may be supported fully by the configurable lateral force applied against the edges of the substrate 102 between the retention pads 114. Since each of the plurality of arms 108 are separately operable in either the position or force mode, the force applied against the edges of the substrate 102 is finely adjustable and can be tuned to "grip" the substrate 102 without distorting or damaging the substrate 102.

Once the substrate 102 is securely retained between the retention pads 114, in operation 510, an actuator in the base device connected to the retaining device 100 may operate to move the retaining device 100 and the substrate 102 retained therein and transfer the substrate 102 to the target stage. Once the substrate 102 is transferred to the target site, in operation 512, the arms 108 of the retaining device retract and the substrate 102 is released on the target stage.

In summation, a device for gripping a substrate and methods for gripping a substrate are shown and described herein. While the foregoing is directed to examples of the present disclosure, other and further examples of the disclosure may be devised without departing from the basic scope thereof, and the scope thereof is determined by the claims that follow.

What is claimed is:

1. An apparatus for retaining an optical device, comprising:
   a base coupled to a proximal end of a stem, wherein the stem extends from a bottom surface of the base along a longitudinal axis;
   a suction pad disposed at a distal end of the stem and positioned at a center of the bottom surface, the suction pad operable to provide a vertical suction force against a substrate to be retained;
   a pair of arms movably coupled to the bottom surface of the base, the pair of arms coupled to an actuator operable to move the pair of arms laterally along a X-Y plane parallel to the bottom surface of the base, and the pair of arms being radially opposite one another about the longitudinal axis;
   a first plurality of retention pads positioned on one of the pair of arms; and
   a second plurality of retention pads positioned another of the pair of arms, the second plurality of retention pads being at least partially misaligned with the first plurality of retention pads about the longitudinal axis.

2. The apparatus of claim 1, further comprising an air inlet, the air inlet in fluid communication with an air source and the suction pad.

3. The apparatus of claim 1, further comprising a visualization system, wherein the visualization system comprises one or more cameras and/or one or more sensors communicatively coupled to a controller, and wherein the one or more cameras and/or one or more sensors are positioned in a plurality of ports positioned circumferentially about the suction pad on the distal end of the stem relative to the longitudinal axis of the stem.

4. The apparatus of claim 3, wherein movement of the pair of arms along the bottom surface of the base is configured to enable the first plurality of retention pads and the second plurality of retention pads to apply a configurable lateral force to edges of the substrate to be retained, and wherein the apparatus further comprises a second actuator coupled to the base that is configured to rotate the pair of arms about the longitudinal axis of the stem.

5. The apparatus of claim 1, further comprising a light source configured to provide light to the substrate to be retained.

6. The apparatus of claim 1, wherein the suction pad is operable to provide a non-contact vertical suction to the substrate to be retained, wherein the suction pad is separated from the substrate to be retained by a gap ranging between about 0.3 millimeters to about 0.8 millimeters.

7. The apparatus of claim 1, wherein the actuator is configured to enable the first plurality of retention pads and the second plurality of retention pads to apply a lateral force to edges of the substrate to be retained, the lateral force ranging from about 0.1 to about 3.8 N, or from about 10 gram to about 350 gram.

8. The apparatus of claim 1, wherein the actuator comprises an electric programmable gripper device.

9. An apparatus for retaining an optical device, comprising:
- a gripper actuator coupled to a proximal end of a stem, wherein the stem extends from a bottom surface of the gripper actuator along a longitudinal axis;
- a suction pad comprising a plurality of apertures and disposed at a distal end of the stem and a center of the bottom surface, the suction pad operable to provide a vertical suction force through the plurality of apertures against a substrate to be retained;
- a first arm and a second arm coupled to the gripper actuator such that the first and second arms radially oppose one another about the longitudinal axis of the stem, wherein the gripper actuator is operable to move the first and second arms laterally along a X-Y plane parallel to the bottom surface of the gripper actuator;
- a first plurality of retention pads positioned on the first arm; and
- a second plurality of retention pads positioned on the second arm, the second plurality of retention pads being at least partially misaligned with the first plurality of retention pads about the longitudinal axis of the stem.

10. The apparatus of claim 9, further comprising an air inlet, the air inlet in fluid communication with an air source and the suction pad.

11. The apparatus of claim 9, further comprising a visualization system, wherein the visualization system comprises one or more cameras and/or one or more sensors communicatively coupled to a controller, and wherein the one or more cameras and/or one or more sensors are positioned in a plurality of ports positioned circumferentially about the suction pad on the distal end of the stem relative to the longitudinal axis of the stem.

12. The apparatus of claim 11, wherein movement of the first and second arms along the bottom surface of the gripper actuator is configured to enable the first plurality of retention pads and the second plurality of retention pads to apply a configurable lateral force to edges of the substrate to be retained, and wherein the apparatus further comprises a second actuator that is configured to rotate the first and second arms about the longitudinal axis of the stem.

13. The apparatus of claim 9, further comprising a light source configured to provide light to the substrate to be retained.

14. The apparatus of claim 9, wherein the suction pad is separated from a top surface of the substrate to be retained by a gap ranging between about 0.3 millimeters to about 0.8 millimeters.

15. The apparatus of claim 9, wherein the gripper actuator is configured to enable the first plurality of retention pads and the second plurality of retention pads to apply a lateral force to edges of the substrate to be retained, the lateral force ranging from about 0.1 to about 3.8 N, or from about 10 gram to about 350 gram.

16. A method for retaining an optical device, comprising:
- positioning a substrate to be retained below a retaining device comprising a first arm having a first plurality of retention pads, and a second arm having a second plurality of retention pads, the first and second arms operatively coupled to an actuator and positioned radially opposite one another about a longitudinal axis of a stem that extends from a base of the retaining device, the stem having a distal end including a suction pad so that the suction pad is disposed at a center of a bottom surface of the base, the suction pad operable to provide a vertical holding force to the substrate to be retained, and the second plurality of retention pads being at least partially misaligned with the first plurality of retention pads about the longitudinal axis;
- moving the retaining device to align the substrate between the first plurality of retention pads and the second plurality of retention pads;
- operating the first arm to move the first plurality of retention pads disposed on the first arm to just contact an edge of the substrate to be retained;
- operating the second arm to move the second plurality of retention pads disposed on the second arm to contact and apply a lateral force to the substrate to be retained; and
- activating the suction pad to provide the vertical holding force to the substrate to be retained.

17. The method of claim 16, further comprising scanning the substrate to be retained with a visualization system coupled to the retaining device, wherein the visualization system comprises one or more cameras and/or one or more sensors communicatively coupled to a controller, and wherein the one or more cameras and/or one or more sensors are positioned in a plurality of ports positioned circumferentially about the suction pad on the distal end of the stem relative to the longitudinal axis of the stem.

18. The method of claim 17, wherein scanning the substrate to be retained enables detecting one or more fiducials on the substrate to be retained and/or determining a size, an orientation, a position, and/or any other physical property of the substrate to be retained.

19. The method of claim 16, wherein activating the suction pad to provide the vertical holding force to the substrate to be retained enables varying the lateral force necessarily applied by the first plurality of retention pads and the second plurality of retention pads to hold the substrate to be retained.

20. The method of claim 16, wherein operating the second arm to apply a lateral force to the substrate to be retained prevents lateral movement and/or rotation of the substrate to be retained.

* * * * *

UNITED STATES PATENT AND TRADEMARK OFFICE
CERTIFICATE OF CORRECTION

| | | |
|---|---|---|
| PATENT NO. | : 12,351,406 B2 | Page 1 of 1 |
| APPLICATION NO. | : 18/151668 | |
| DATED | : July 8, 2025 | |
| INVENTOR(S) | : Yaseer Arafath Ahamed et al. | |

It is certified that error appears in the above-identified patent and that said Letters Patent is hereby corrected as shown below:

On the Title Page

In Column 1, item (65) under "Prior Publication Data", Line 1, below "US 2023/0227276 A1 Jul. 20, 2023" insert -- (60) Related U.S. Application Data Provisional application No. 63/300,543, filed on Jan. 18, 2022. --.

Signed and Sealed this
Thirteenth Day of January, 2026

John A. Squires
*Director of the United States Patent and Trademark Office*